United States Patent
Ehrsam et al.

(10) Patent No.: US 10,348,157 B2
(45) Date of Patent: Jul. 9, 2019

(54) ELECTRIC MOTOR WITH A PLASTIC HOUSING

(71) Applicant: BÜHLER MOTOR GMBH, Nürnberg (DE)

(72) Inventors: Jürgen Ehrsam, Fürth (DE); Harald Rausch, Fürth (DE); Maximilian Schupfner, Wilhermsdorf (DE); Thomas Häusler, Oberasbach (DE); Matthias Krause, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 179 days.

(21) Appl. No.: 15/483,031

(22) Filed: Apr. 10, 2017

(65) Prior Publication Data
US 2017/0302133 A1    Oct. 19, 2017

(30) Foreign Application Priority Data

Apr. 15, 2016 (DE) .......................... 10 2016 206 404

(51) Int. Cl.
| | |
|---|---|
| H02K 5/24 | (2006.01) |
| F04D 13/06 | (2006.01) |
| F04D 29/046 | (2006.01) |
| F04D 29/22 | (2006.01) |
| F04D 29/42 | (2006.01) |
| H02K 1/14 | (2006.01) |
| H02K 1/27 | (2006.01) |
| H02K 5/02 | (2006.01) |
| H02K 7/14 | (2006.01) |
| H02K 11/00 | (2016.01) |
| H02K 1/18 | (2006.01) |
| H02K 3/52 | (2006.01) |
| H02K 5/128 | (2006.01) |

(Continued)

(52) U.S. Cl.
CPC ............... *H02K 5/24* (2013.01); *F04D 13/06* (2013.01); *F04D 29/046* (2013.01); *F04D 29/22* (2013.01); *F04D 29/426* (2013.01); *H02K 1/146* (2013.01); *H02K 1/185* (2013.01); *H02K 1/2706* (2013.01); *H02K 3/522* (2013.01); *H02K 5/02* (2013.01); *H02K 5/128* (2013.01); *H02K 7/14* (2013.01); *H02K 11/0094* (2013.01); *H02K 11/33* (2016.01); *H02K 15/022* (2013.01); *H02K 15/14* (2013.01); *H02K 2203/12* (2013.01)

(58) Field of Classification Search
CPC ............. H02K 5/02; H02K 5/24; H02K 1/185
See application file for complete search history.

(56) References Cited

U.S. PATENT DOCUMENTS

| | | | | |
|---|---|---|---|---|
| 7,385,323 | B2 * | 6/2008 | Takahashi ................ | H02K 3/38 310/194 |
| 7,692,355 | B2 * | 4/2010 | Ihle ........................ | H02K 1/145 29/596 |

FOREIGN PATENT DOCUMENTS

DE    10 2009 047 332 A1    6/2011

* cited by examiner

*Primary Examiner* — Dang D Le
(74) *Attorney, Agent, or Firm* — Westerman, Hattori, Daniels & Adrian, LLP

(57) ABSTRACT

An electric motor, in particular a pump motor, made up of a permanent magnet rotor, a wound stator, having a stator laminate package, insulating elements and a stator winding, a motor housing made of plastic material and a component carrying a rotor bearing, in particular a pump head. It is an object of the invention to provide a generic motor with a reliable and economically feasible fastening of the stator to the motor housing, wherein heat expansion cracks are avoided and noise transmissions can be reduced.

13 Claims, 6 Drawing Sheets

(51) Int. Cl.
*H02K 15/02* (2006.01)
*H02K 15/14* (2006.01)
*H02K 11/33* (2016.01)

ELECTRIC MOTOR WITH A PLASTIC HOUSING

BACKGROUND OF THE INVENTION (1) Field of the Invention

The invention relates to an electric motor, in particular a pump motor, having a permanent magnet rotor, a wound stator, with a stator laminate package, insulating elements and a stator winding, a motor housing made of plastic material and a component carrying a rotor bearing, in particular a pump head.

(2) Description of Related Art Including Information Disclosed Under 37 CFR 1.97 and 1.98

In the case of combustion engines in the motor vehicle sector, mechanical pumps, which are driven by the crankshaft via a cam belt, are generally provided as main cooling water pumps. As a support or an alternative in a shut-off combustion engine, electric ancillary cooling water pumps are used, which are generally designed as electronically commutated direct-current motors. Main cooling water pumps can also be operated electrically. Likewise, cooling water pumps are also used in hybrid and electric vehicles. There, mainly in the cooling circuit of a battery cooling system. Electronically commutated DC motors are further used as a drive for blowers, air, fuel and oil pumps. From DE 10 2009 047 332 A1, a generic electric motor is known, in which the stator is welded to the motor housing. In the known pump, there is the danger that in case of severe temperature fluctuations, due to the different materials used (metal, plastic) and based on differences in thermal expansion damages to the welded joint can occur. In addition, undesired noise transmissions can occur due to the shown large-area installation of stator parts on the motor housing.

BRIEF SUMMARY OF THE INVENTION

It is therefore the object of the invention to provide for a reliable and economically feasible fastening of the stator to the motor housing in a generic electric motor, whereby thermal expansion cracks are avoided and noise transmissions can be reduced.

By welding an insulating element to the motor housing, sound sources or noise transmitters, for example a containment shell, can be decoupled from the stator. This makes a significant noise reduction possible. Furthermore, a shortening of tolerance chains and an exact positioning of further components such as electronics to the housing are possible. In addition, the welding allows a direct introduction of stator forces into the housing and thus a relief of connecting regions between the component bearing the rotor, e.g. the pump head, and the motor housing and possibly a containment shell. In addition, the number of connecting elements and thus the weight can be reduced. Owing to greater tolerances and a smaller number of parts, a particularly economical production is possible. The mentioned advantages can be achieved more clearly, if both insulating elements are welded to the motor housing.

For the welded connection with the housing, additional fastening projections are provided, which extend radially in the direction of the motor housing. As a result, the stator can be kept at a small distance from the motor housing and noise transmissions can thereby be prevented or at least significantly reduced. As a result of the connection to the motor housing, the stator can also be decoupled from a containment shell.

In order to ensure a fixed mechanical and play-free connection even in the case of large temperature differences, axial mirror balancing means are provided, which in particular can compensate for different longitudinal extensions between the plastic housing of the motor housing and the metal material of the stator laminate.

These axial play balancing means are produced by means of a special geometrical shaping of the fastening projections and/or their transitional area, in particular bridge sections, to the insulating element by providing clearances and/or deflectable arms and/or the transitional areas are designed as compliant areas.

However, it is also possible for the motor housing to comprise compliant fastening regions, to which at least one of the insulating elements is welded. A combination is also possible, in which both the insulating elements and the motor housing are provided with compliant regions.

For a good insulating effect, a substantially annular cover disc often suffices.

The insulating elements can be designed in different ways. Insulating elements, which, in addition to the annular covering disk, also have groove linings extending axially in stator slots, have been found to be particularly expedient. In addition to the insulating effect, the groove linings also contribute to a more stable mounting of the stator in the motor housing, because they engage deeply with the stator slots and effect a firm hold of the stator core, in particular of the stator lamination package, through the plurality of groove linings. Finally, the insulating elements are held on the stator core by the wire tension of the stator winding.

The formation of axial projections on the second insulating element results in further advantageous embodiments of the invention. In particular, an axial mounting space for a circuit board can be limited by the axial projections.

Furthermore, the axial projections can have radial limiting surfaces. With these they can, for example, abut against radial limiting means of a carrier plate. The carrier plate can further have stop surfaces, which serve as an axial boundary for the mounting space of the printed circuit board. At the same time, the radial limiting means of the carrier plate can limit the radial installation space of the printed circuit board. All these measures serve to hold the circuit board positively and to hold it in the housing without play. For this purpose, the printed circuit board is clamped between the fastening projections of the insulating elements and the motor housing, with the carrier plate being interposed, and fixed in this position by welding the insulating elements or at least one insulating element to the motor housing.

In a further development of this method, it is proposed that the welding of the insulating element to the motor housing is effected by means of laser transmission welding. This is a proven process for joining plastic parts together. For this purpose, the housing material consists of a material transparent to laser light, while the insulating element consists of a material which absorbs the laser light. The insulating element is preferably welded to the motor housing via preferably three welding regions. At least in a pre-assembly state, a circumference described by the outer contours of the insulating element is greater than the inner diameter of the motor housing in the welding region. This results in a press fit between the motor housing and the insulating element.

A laser beam directed from the outside onto the motor housing penetrates it in only slightly weakened condition, and hits the welding region of the insulating element, where it is largely absorbed, thus heating the welding region and the adjacent motor housing until the plastic material melts. Due to the press fit, the motor housing and the insulating element move slightly towards one another in the welding region and closely join each other. In order to establish a good welded connection, the entire area, in which the welding partners are abutted against each other, must be heated. For this purpose, the width of the welding region is adapted to the diameter, in particular the effective diameter, of the laser beam.

Alternatively to the use of plastic materials with different transmission properties, it is also possible to use the same semi-transparent materials, which are irradiated with one or more laser beam(s) concentrated on the welding region. Since the motor housing must not be melted on the surface, the intensity of the laser beam or the laser beams should be significantly lower in this area than in the welding area. For this purpose, it is proposed that a plurality of beam bundles coming from different directions overlap in the welding region.

It is aimed at holding the stator laminate package by means of the insulating elements under axial pretensioning. As a result, any extensions or shrinking of the stator lamination relative to the motor housing caused by temperature fluctuations can be compensated for.

In order to be able to absorb large axial forces, at least one of the insulating elements should be welded to the motor housing completely or over a large circumferential area or over large peripheral areas.

Preferably, the insulating element, which is in axial contact with the circuit board, should be welded to the motor housing completely or over a large peripheral area or over large peripheral areas. This ensures that the printed circuit board is clamped and held axially securely by the insulating element. The centering is preferably effected via the carrier plate.

The invention also comprises pump motors, in particular centrifugal pump motors, with the described characteristics and configurations.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
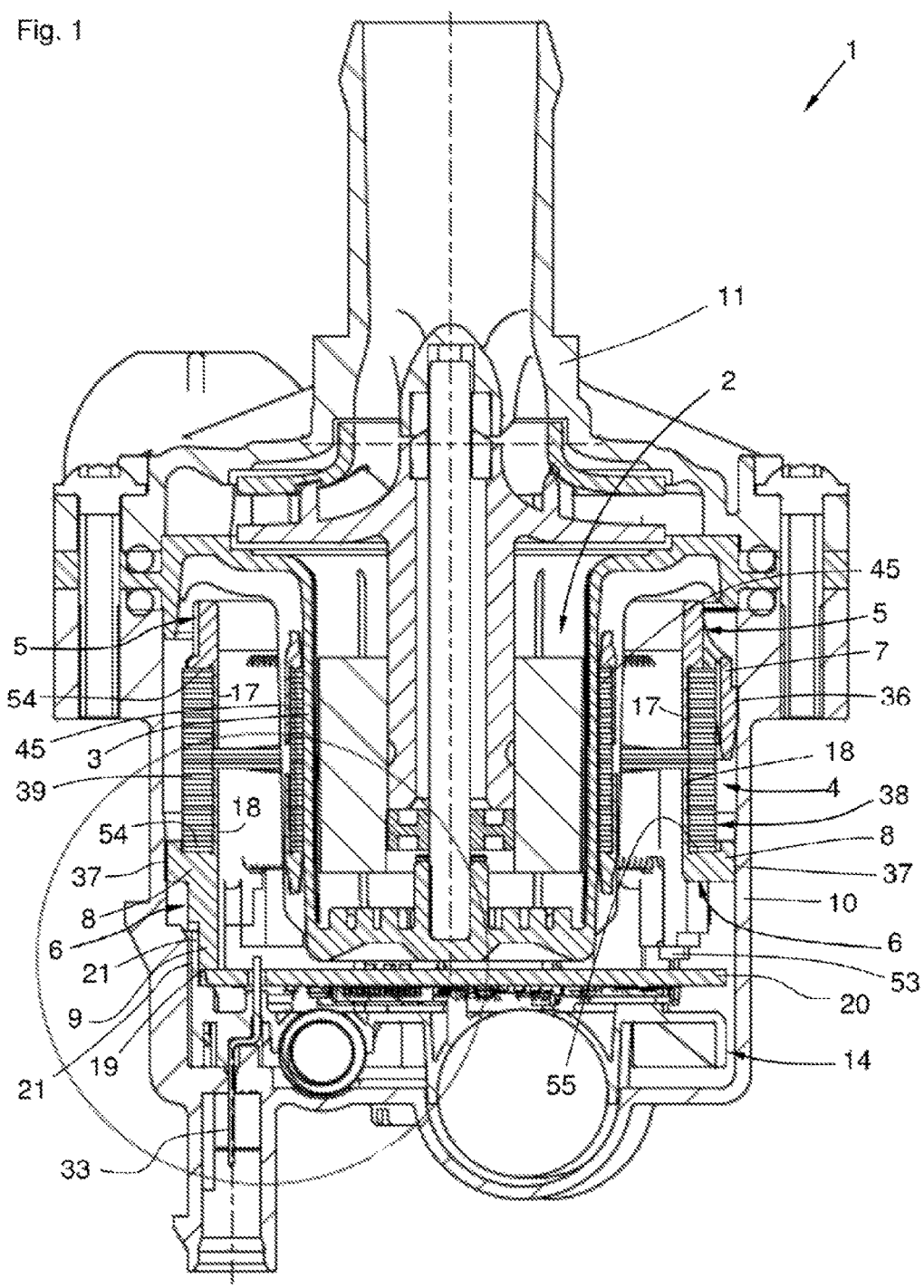
FIG. 1 is a sectional view of an electric motor according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a sectional view of an electric motor 1 according to the invention, with a wound stator 4, a permanent magnet rotor 2, a containment shell 3, a pump head 11, a printed circuit board 20, a carrier plate 14 and a motor housing 10. The stator 4, the circuit board 20 and the carrier plate 14 are located in a dry space 25 (see FIG. 2). The permanent magnet rotor 2 is rotatably mounted in a wet space 26 (see FIG. 2) about an axis 49, which, on the one hand, is fixed in the containment shell 3 and, on the other hand, in the pump head 11. The stator 4 comprises a stator laminate package 38 and insulating elements 6. A stator winding 40 (see FIG. 8 and FIG. 9) is not shown here. The stator laminate package 38 comprises a closed magnetic return ring 39 with radially inwardly extending poles 45, which alternate with grooves, into which groove lining regions 17, 18 of the insulating elements 5, 6 are inserted. The insulating elements 5, 6 have axial covers 54 and 55, respectively, which axially cover the magnetic return ring 39. Fastening projections 7, 8 extend from the insulating elements 5, 6 in radial direction. The fastening projections 7, 8, also referred to as attachment projections have welding regions 36, 37, in which they are firmly connected to the motor housing 10.

The stator 4 is attached to the motor housing 10 via the insulating elements 5, 6 such that the stator laminate package 38 and the stator winding 40 (FIGS. 8 and 9) are axially fixed. The second insulating element 6 is equipped with axially inserted winding connections 53, which are mechanically and electrically connected to the printed circuit board 20 as press-fit contacts. The stator 4 is largely decoupled from the containment shell 3. An insulating element 6 on the side of the circuit board comprises axial projections 9, which axially abut against the printed circuit board 20. The printed circuit board 20 is positively fixed between the axial projections 9 and the carrier plate 14. The carrier plate 14 has a stop surface 19, which serves the purpose of axially fixing the printed circuit board 20. On the opposite side, the carrier plate 14 abuts against a bottom 34 (see FIG. 2) of the motor housing 10. Furthermore, the carrier plate 14 comprises radial limiting means 21, which limit the radial mounting space of the printed circuit board 20.

Figure 2:
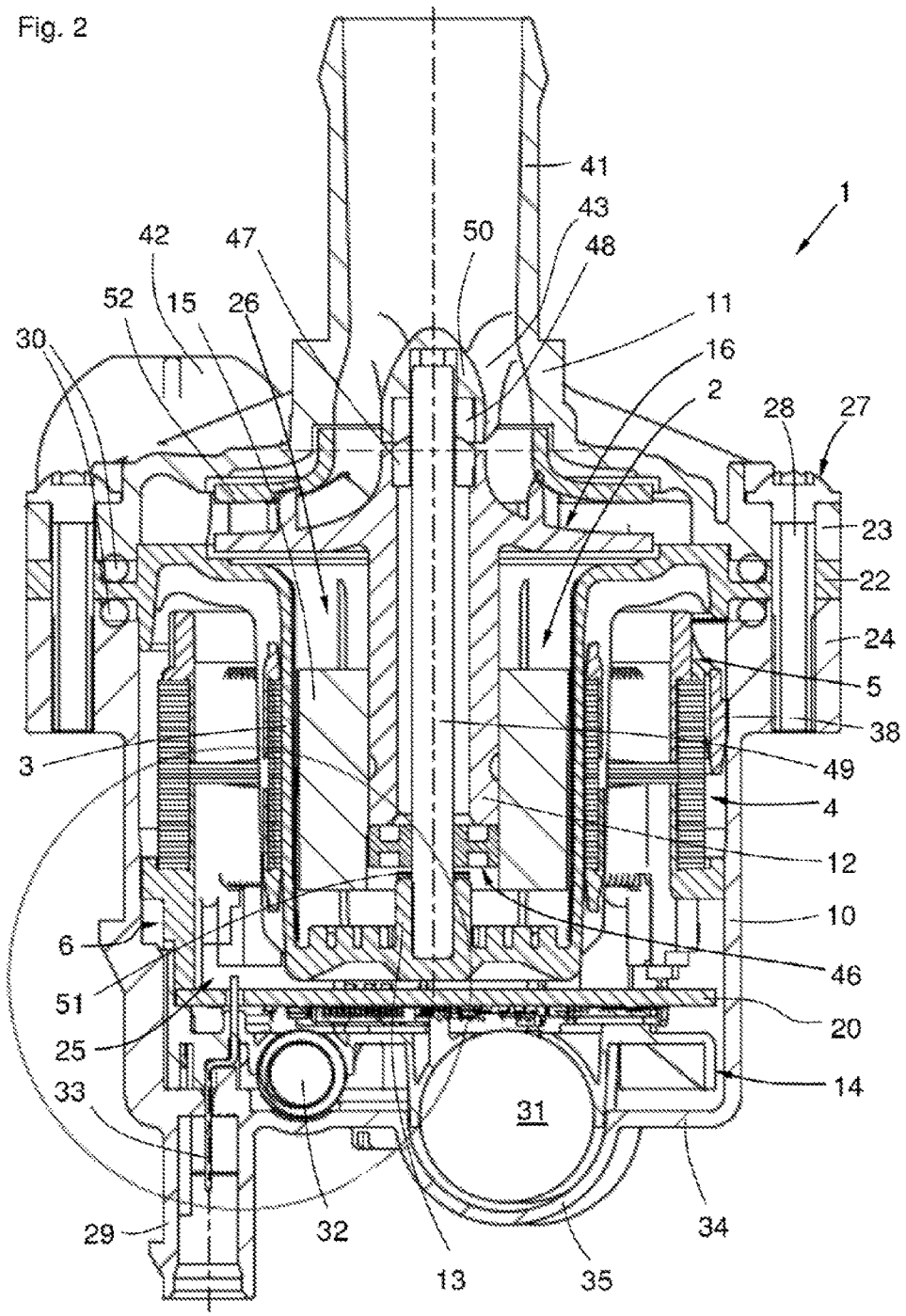
FIG. 2 is a second sectional view of the electric motor according to the invention.

FIG. 2 shows a second sectional view of the electric motor 1 according to the invention, with the wound stator 4, the permanent magnet rotor 2, the containment shell 3, the pump head 11, the circuit board 20, the carrier plate 14 and the motor housing 10. The containment shell 3 has a containment shell flange 22 and the pump head 11 has a pump head flange 23. The motor housing 10 is of a pot-like design and has a housing flange 24 and a connector shaft 29. The pump head flange 23, the containment shell flange 22 and the housing flange 24 have fastening eyes 27 with screws 28, by means of which the pump head 11 and the containment shell 3 are screwed to the motor housing 10. On the other side of the containment shell flange 23, O-rings 30 are arranged as sealing elements. The printed circuit board 20 is equipped with a plurality of SMD components. Larger components, such as an electrolytic capacitor 31 and an induction coil 32, are mechanically held on the carrier plate 14, but are electrically contacted on the printed circuit board 20. The circuit board 20 and the carrier plate 14 are axially fixed between the stator 4 and the motor housing 10. The printed circuit board 20 is fixed axially and radially between the stator 4 and the carrier plate 14. A contact element 33, which is likewise electrically connected to the circuit board 20, is mechanically received in the carrier plate 14. A bottom 34 of the pot-like motor housing 10 has a bulge 35, which is adapted to the shape of the electrolytic capacitor 31. A pump impeller 16 is shown, which is integrally formed with a hollow shaft 12. The impeller 16 has a cover disc 52. The permanent magnet rotor 2 with pump impeller 16 is rotatably mounted on the axis 49 via a fixed bearing 46 and a spherical sliding bearing 47 and between the pump head 11 and the containment shell 3. The spherical bearing 47 abuts against a spherical counter bearing 48. The fixed bearing 46 is arranged between a hollow-cylindrical permanent magnet 15, which is made of a plastic-bound material and injected around the hollow shaft 12, and the axis 49. The fixed bearing 46 bears the impeller 16 radially as well as axially via the end of the hollow shaft 12 and a thrust washer 51, which abuts against a bearing-receiving sleeve 13 integrally formed with the containment shell 3. Further, FIG. 2 shows the wet space 26, the dry space 25, a stator laminate package 38, and the insulating elements 5, 6. A stator winding 40 (see FIG. 8 and FIG. 9) is not shown here. The pump head 11 comprises a suction port 41 and a pressure connection port 42. In the suction port 41, spokes 43 create a permeable connection between the suction port 41 and the receptacle 50.

Figure 3:
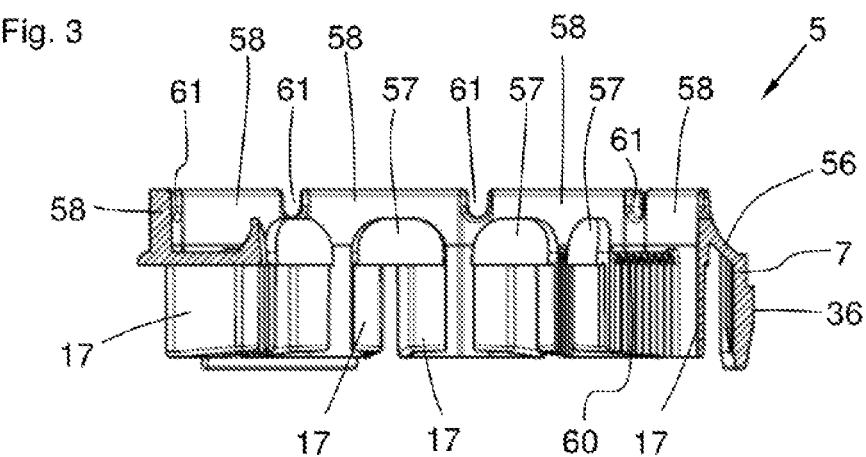
FIG. 3 is a sectional view through an insulating element.

FIG. 3 shows a sectional view through the first insulating element 5, with a fastening projection 7, which is integrally formed with a ring section 58 via a bridge section 56 and has a welding area 36. The annular sections 58 are partially separated from one another by means of clearances 61. The groove lining regions 17 adjoin the annular sections 58, which have axially projecting winding head retaining projections 57 in their central inner region. The groove lining regions 17 have wire guide grooves 60 on their outwardly pointing surface, which ensure an ordered wire laying. The bridge section 56 is dimensioned in such a way that it permits an anticipated thermal expansion compensation. For this purpose, the bridge sections 56 extend at an angle of approximately 45°+−15° with respect to the motor axis and are of a smaller width than the fastening projections 7.

Figure 4:
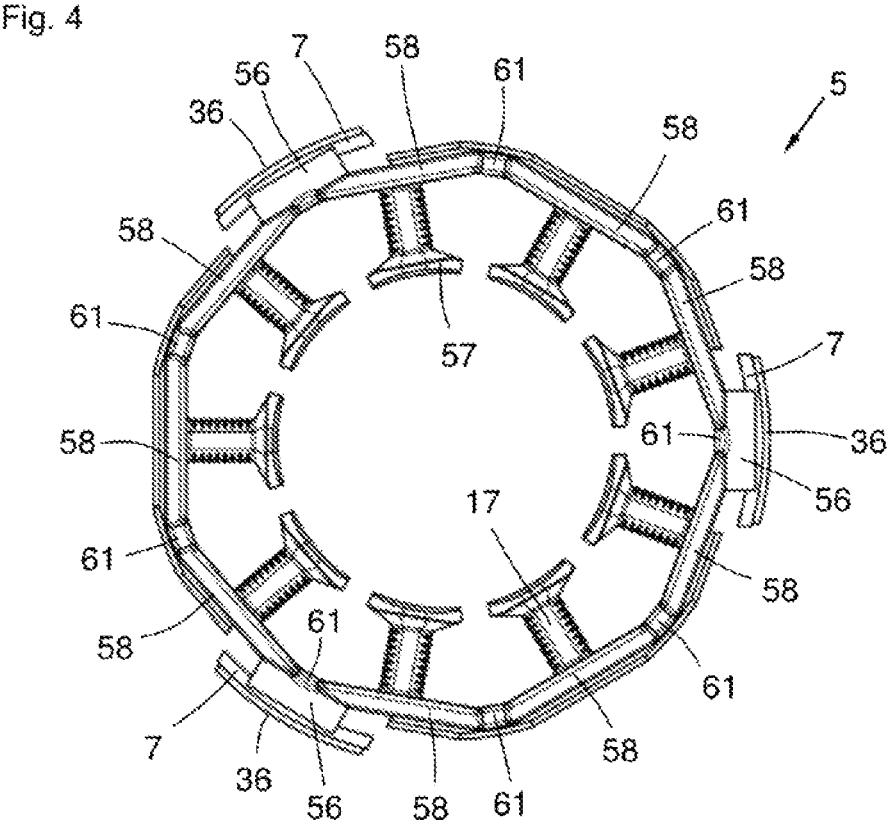
FIG. 4 is a front view of the insulating element.

FIG. 4 shows a front view of the first insulating element 5, the groove lining areas 17, which also cover the front face of the poles, the winding head holding projections 57, the ring sections 58, the clearances 61, the fastening projections 7 with their welding areas 36 and the bridge sections 56. In the example shown, three fastening projections 7 are provided; they protrude radially over the annular sections 58 and prevent large-area contact between the insulating elements 5 and thus between the stator and the motor housing.

Figure 5:
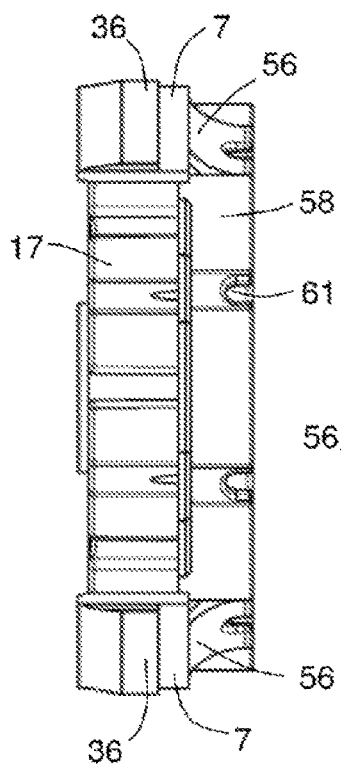
FIG. 5 is a side view of the insulating element.

FIG. 5 shows a side view of the first insulating element 5, with the groove lining areas 17, the ring sections 58, the clearances 61 and the fastening projections 7, with their welding areas 36 and the bridge sections 56.

Figure 6:
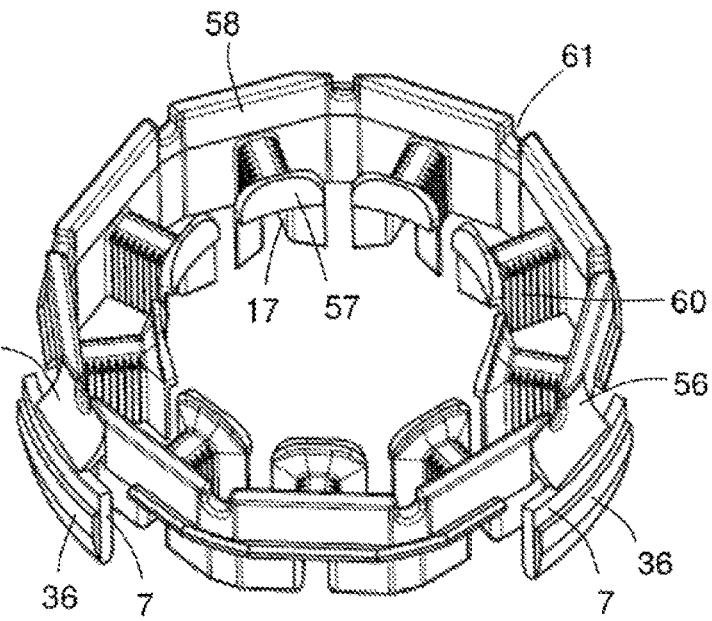
FIG. 6 is a spatial representation of the insulating element.

FIG. 6 shows a three-dimensional representation of the first insulating element 5, with the groove lining areas 17, with their wire guide grooves 60, the winding head holding projections 57, the fastening projections 7, with their welding areas 36, the ring sections 58, the clearances 61 and the bridge sections 56.

Figure 7:
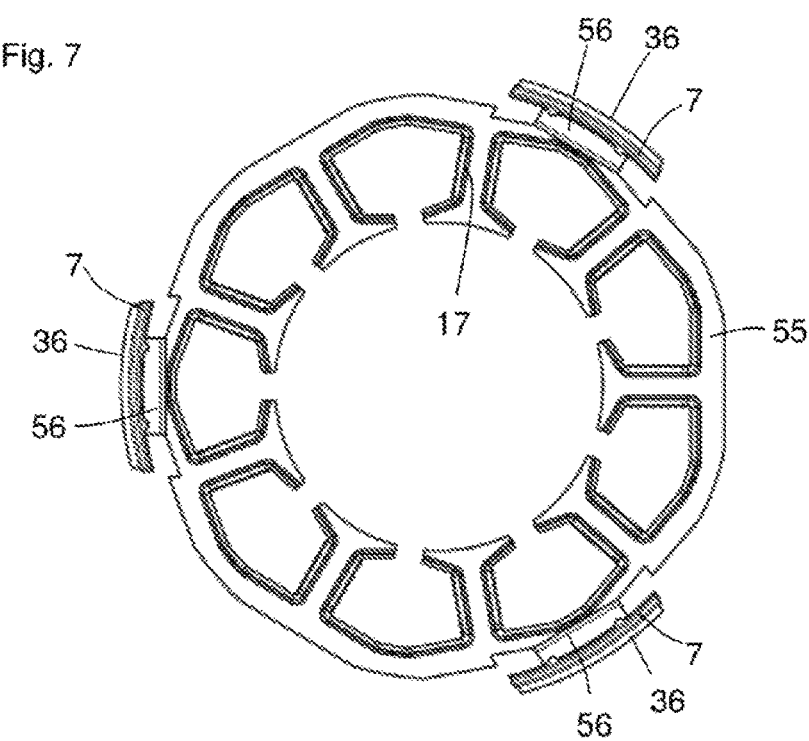
FIG. 7 is a rear view of the insulating element.

FIG. 7 shows a rear view of the first insulating element 5, with the groove lining areas 17, the cover disc 55, the fastening projections 7, with their welding areas 36 and the bridge sections 56.

Figure 8:
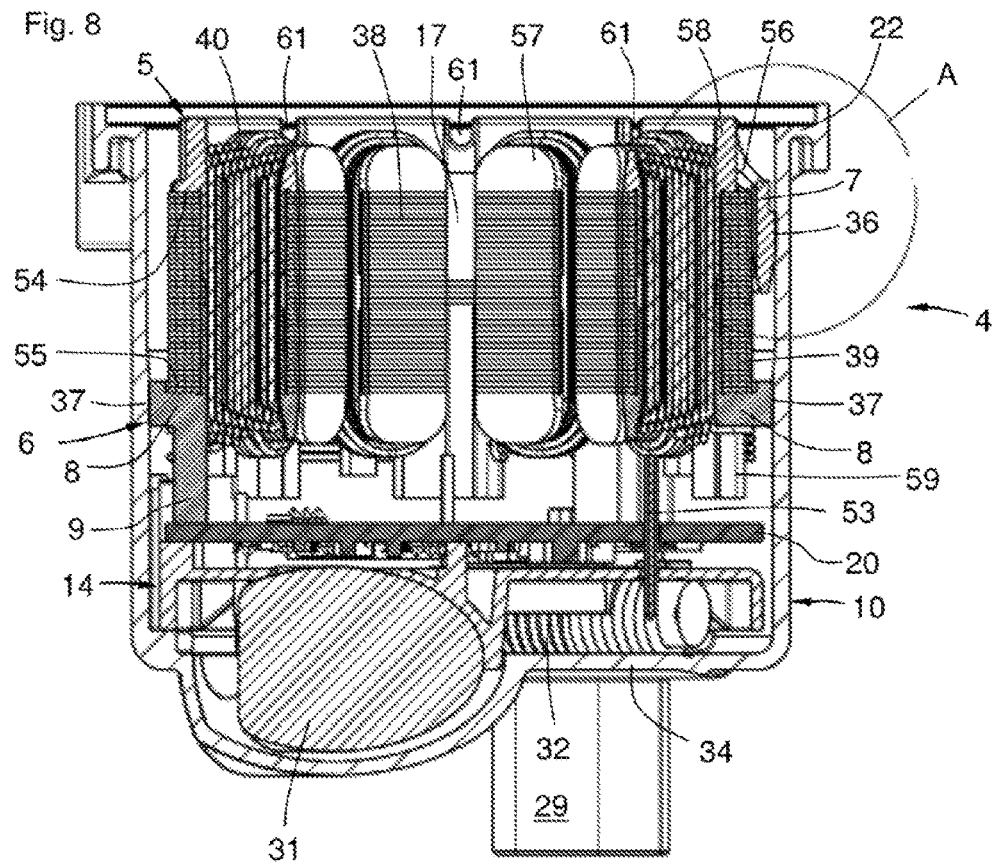
FIG. 8 is a stator of the electric motor.

FIG. 8 shows the stator 4 of the electric motor 1, which is fixed in the motor housing 10, with the first insulating element 5, the second insulating element 6, the stator laminate package 38, the printed circuit board 20 and the carrier plate 14. The stator laminate package 38 comprises the magnetic return ring 39, which is axially covered by the first cover disc 54 of the first insulating element 5 and by the second cover disc 55 of the second insulating element 6. The first insulating element 5 is shown with a fastening projection 7, the bridge 56 and the welding region 36. The first insulating element 5 is connected to the motor housing 10 firmly but compliantly via the welding region 36. The yielding effect can provide both radial and axial thermal expansion compensation. Furthermore, the first insulating element 5 has the groove lining regions 17, the annular sections 58 and the clearances 61, carries the winding 40 and insulates the latter from the stator laminate package 38. The winding 40 is electrically connected to the printed circuit board 20 via winding connections 53. In the example shown, the second insulating element 6 has fastening projections 8, which are connected to the second insulating element 6 without compliant bridge sections 56. Alternatively, however, compliant bridge sections 56 can also be provided here. The second insulating element 6 is integrally formed with a wire laying ring 59, which receives connecting wires, which are laid between the individual windings.

The motor housing 10 comprises the containment shell flange 22, the bottom 34 and the connector shaft 29. The carrier plate 14 receives the electrolytic capacitor 31 and the induction coil 32 and, on the one hand, is supported on the bottom 34 of the motor housing 10 and, on the other hand, on the printed circuit board 20. The printed circuit board 20 is accommodated axially between the axial projection 9 and the carrier plate 14. The fastening projections 7 of the first insulating element 5 and the fastening projections 8 of the second insulating element 6 describe an outer circle whose diameter in a pre-assembly state is greater than the inner diameter of the motor housing 10 at the respective connection point. Since the motor housing 10 tapers slightly towards the bottom 34 for injection-molding reasons, the said diameters are not identical. A press connection exists between the motor housing 10 and the fastening projections 8 and 9 after assembly, but before welding. This is at least partially attenuated by the welding process.

Figure 9:
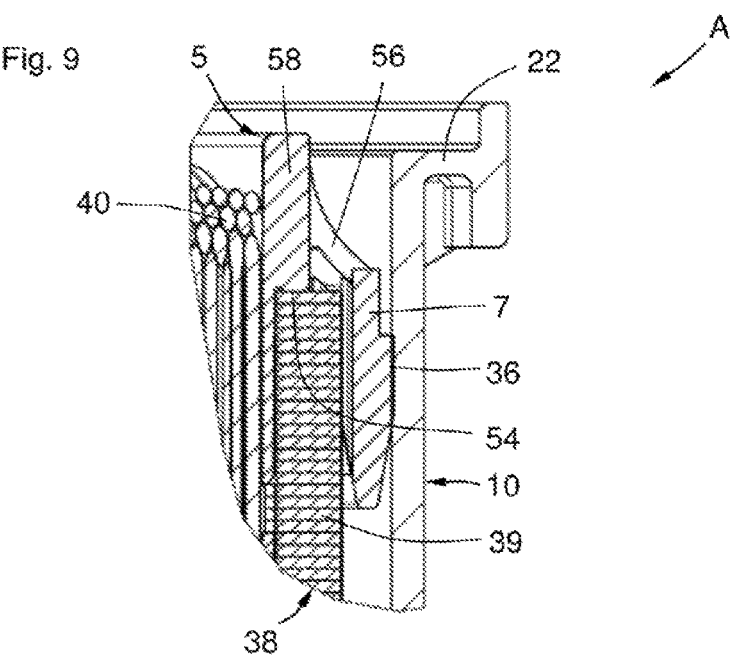
FIG. 9 is an enlarged detail A of FIG. 8.

FIG. 9 shows an enlarged detail A from FIG. 8, with the motor housing 10, the stator laminate package 38, the magnetic return ring 39, the first insulating element 5 and the winding 40. The insulating element 5 is illustrated with the first cover disc 54, the fastening projection 7, with its welding region 36, the bridge part 56 and the annular part 58. Furthermore, the containment shell flange 22 is shown.

Figure 10:
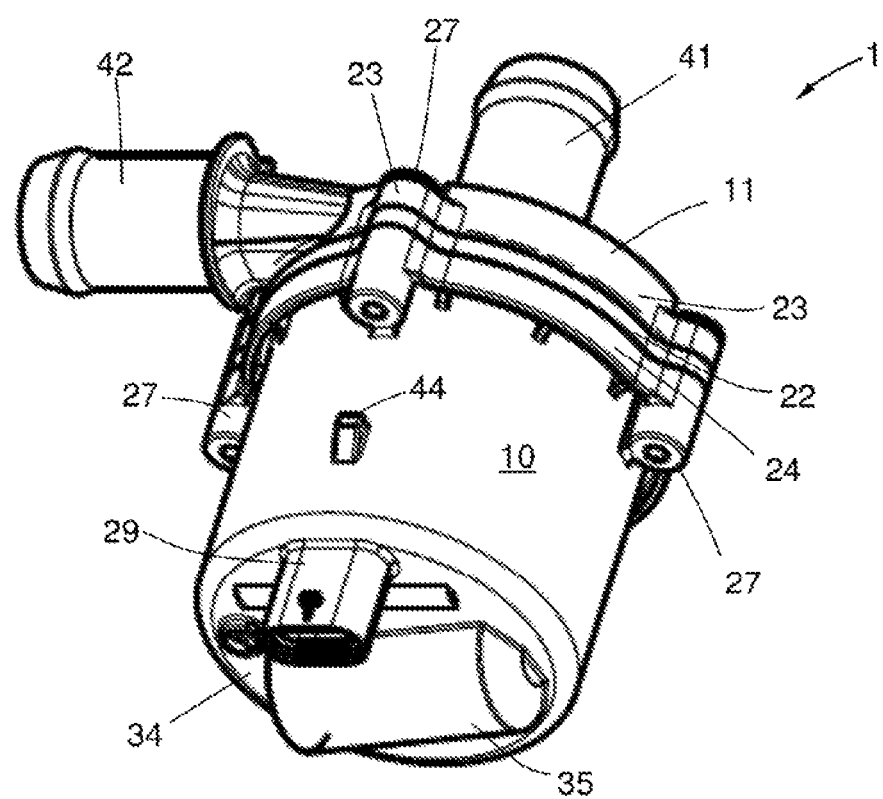
FIG. 10 is a spatial representation of the electric motor.

FIG. 10 shows a three-dimensional view of the electric motor 1, with the pump head 11, with the suction port 41 and pressure port 42 and a pump head flange 23, a containment shell flange 22 integral with the containment shell 3, the motor housing 10 with the housing flange 24, the bottom 34, 29 and the bulge 35 for receiving an electrolytic capacitor 31. Furthermore, fastening eyes 27 can be seen, which are designed as extensions in the pump head flange 23, the containment shell flange 22 and the housing flange 24 and allow a screw connection. On the motor housing 10, an axial securing shape 44 is formed, which serves the purpose of axially securing an annular fastening device arranged around the motor housing 10.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the

LIST OF REFERENCE SYMBOLS

| | |
|---|---|
| 1 | electric motor |
| 2 | permanent magnet rotor |
| 3 | containment shell |
| 4 | stator |
| 5 | first insulating element |
| 6 | second insulating element |
| 7 | first fastening projection |
| 8 | second mounting peojection |
| 9 | axial projection |
| 10 | stator housing |
| 11 | pump head |
| 12 | hollow shaft |
| 13 | bearing-receiving sleeve |
| 14 | carrier plate |
| 15 | permanent magnet |
| 16 | pump impeller |
| 17 | first groove lining area |
| 18 | second groove lining area |
| 19 | stop surface |
| 20 | circuit board |
| 21 | radial limiting means |
| 22 | containment shell flange |
| 23 | pump head flange |
| 24 | housing flange |
| 25 | dry space |
| 26 | wet space |
| 27 | fastening eye |
| 28 | screw |
| 29 | connector shaft |
| 30 | O-ring |
| 31 | electrolytic capacitor |
| 32 | inductor coil |
| 33 | contact element |
| 34 | bottom |
| 35 | protrusion |
| 36 | first welding area |
| 37 | second welding area |
| 38 | stator laminate package |
| 39 | magnetic return ring |
| 40 | stator winding |
| 41 | suction port |
| 42 | pressure port |
| 43 | spoke |
| 44 | axial securing shape |
| 45 | pole |
| 46 | fixed bearing |
| 47 | spherical sliding bearing |
| 48 | spherical counter bearing |
| 49 | axis |
| 50 | intake |
| 51 | stop disk |
| 52 | cover disc |
| 53 | winding connection |
| 54 | first cover disc |
| 55 | second cover disc |
| 56 | bridge section |
| 57 | winding head holding projection |
| 58 | ring section |
| 59 | wire laying ring |
| 60 | wire guide groove |
| 61 | clearance |

What is claimed is:

1. An electric motor comprising:
a permanent magnet rotor;
a wound stator having a stator laminate package, insulating elements at least one of which is an attachment projection which has axial play balancing means and/or radial play balancing means, and a stator winding;
bridge sections, wherein the at least one attachment projection and/or the bridge sections are provided with clearances relative to the insulating elements and/or are provided with deflectable arms, and/or are configured as compliant regions;
a motor housing covering the permanent magnet rotor and the wound stator, the motor housing being made of plastic material; and
means for welding at least one of the insulating elements to the motor housing.

2. The electric motor according to claim 1, wherein all of the insulating elements are welded to the motor housing.

3. The electric motor according to claim 1, wherein the motor housing comprises compliant fastening regions, to which at least one of the insulating elements is welded.

4. The electric motor according to claim 1, wherein at least one of the insulating elements has a substantially annular cover disc.

5. The electric motor according to claim 1, further comprising grooves in the stator laminate package, wherein at least one insulating element comprises groove lining areas extending axially into the grooves of the stator laminate package.

6. The electric motor according to claim 1, wherein the insulating elements are welded to the motor housing by laser transmission welding.

7. The electric motor according to claim 1, wherein the insulating elements hold the stator laminate package axially under pretensioning.

8. The electric motor according to at claim 1, wherein the insulating elements are mounted in the motor housing under radial pretensioning.

9. The electric motor according to claim 1, wherein one of the insulating elements is welded to the motor housing completely or over at least a large peripheral area.

10. The electric motor according to claim 9, wherein the insulating element, which is in axial contact with the printed circuit board, is welded to the motor housing over at least a large peripheral region.

11. An electric motor comprising:
a permanent magnet rotor;
a wound stator having a stator laminate package, first and second insulating elements, and a stator winding;
a motor housing covering the permanent magnet rotor and the wound stator, the motor housing being made of plastic material, and
a carrier plate with radial limiting means being within the motor housing means for welding at least one of the insulating elements to the motor housing;
wherein the second insulating element includes axial projections having radial limiting means, the axial projections defining an axial mounting space for a circuit board and the radial limiting means of the axial projections abutting abut against a radial limiting means of a carrier plate.

12. The electric motor according to claim 11, wherein the carrier plate has stop surfaces, which serve as an axial boundary for the mounting space of the circuit board.

13. The electric motor according to claim 11, wherein the radial limiting means defines the radial installation space of the circuit board.

* * * * *